US009739994B1

(12) United States Patent
Loeb

(10) Patent No.: US 9,739,994 B1
(45) Date of Patent: Aug. 22, 2017

(54) METHODS AND APPARATUS FOR REACQUIRING A TARGET ON A MICROSCOPE SLIDE

(71) Applicant: William A. Loeb, Glens Falls, NY (US)

(72) Inventor: William A. Loeb, Glens Falls, NY (US)

( * ) Notice: Subject to any disclaimer, the term of this patent is extended or adjusted under 35 U.S.C. 154(b) by 0 days.

(21) Appl. No.: 15/373,636

(22) Filed: Dec. 9, 2016

(51) Int. Cl.
*G02B 21/26* (2006.01)
*G02B 21/34* (2006.01)

(52) U.S. Cl.
CPC ............. *G02B 21/26* (2013.01); *G02B 21/34* (2013.01)

(58) Field of Classification Search
CPC ......... G02B 21/00; G02B 21/24; G02B 21/26
USPC ....... 359/362, 363, 368, 369, 391, 392, 393, 359/394
See application file for complete search history.

(56) References Cited

U.S. PATENT DOCUMENTS

| | | | |
|---|---|---|---|
| 2,802,111 A | 8/1957 | Reisner | |
| 3,435,212 A * | 3/1969 | Yoder | G01J 5/02 250/316.1 |
| 3,727,051 A | 4/1973 | Page | |
| 3,779,400 A | 12/1973 | Brockman et al. | |
| 4,374,327 A | 2/1983 | Christov | |
| 4,442,388 A | 4/1984 | Phillips | |
| 4,833,382 A | 5/1989 | Gibbs | |
| 5,000,554 A | 3/1991 | Gibbs | |
| 5,260,632 A * | 11/1993 | Schalz | G02B 21/24 318/280 |
| 5,317,154 A | 5/1994 | Honda | |
| 5,780,853 A | 7/1998 | Mori et al. | |
| 6,590,703 B2 * | 7/2003 | Park | B82Y 35/00 359/368 |
| 7,098,620 B2 | 8/2006 | Hayashi | |
| 7,136,708 B2 | 11/2006 | Yamaguchi | |

(Continued)

OTHER PUBLICATIONS

NB83081668, 'Microscope attachment for accurately locating angle and track location of a magnetic disk for defect data for visual inspection of microscopic coating defects', IBM Technical Disclosure Bulletin, vol. 26, No. 3B, pp. 1668-1672, Aug. 1, 1983.*

(Continued)

*Primary Examiner* — Arnel C Lavarias
(74) *Attorney, Agent, or Firm* — Tech Valley Patent, LLC; John Pietrangelo

(57) ABSTRACT

Methods and apparatus for reacquiring a target on a slide in the field of view of a microscope are provided. The methods and apparatus include a housing, a linear potentiometer positioned in the housing, a contact slidably mounted in the housing and adapted to selectively contact the linear potentiometer, wherein a position of the contact on the linear potentiometer determines the signal output by the linear potentiometer; a linkage having a first end operatively connected to the contact and a second end operatively connected to the slide having the target, wherein the slide is translatable in a first direction; and a receiver adapted to receive a signal output by the linear potentiometer and, using the signal, determine a position of the slide. The linear potentiometer may be a membrane-type linear potentiometer. Aspects also include methods and devices for re-positioning a slide on a stage in a predetermined position.

26 Claims, 11 Drawing Sheets

(56) References Cited

U.S. PATENT DOCUMENTS

2003/0012420 A1   1/2003   Verwoerd et al.
2003/0161515 A1   8/2003   Salmon et al.
2007/0076983 A1   4/2007   Doerrer

OTHER PUBLICATIONS

U.S. Appl. No. 90/001,421, filed Apr. 7, 2015, Youn.
Spectra Symbol "Soft Pot" Potentiometer, www.spectasymbol.com.
Spectra Symbol "Soft Pot" Potentiometer, "How it works," www.spectasymbol.com.
Spectra Symbol "Soft Pot" Potentiometer, "Data Sheet," www.spectasymbol.com.
Spectra Symbol "Soft Pot" Potentiometer, "Diagrams & Schematics," www.spectasymbol.com.
Olympus Stage U-SVRB-4 Specification, 1 p., 2014.

* cited by examiner

FIG. 1 _PRIOR ART_

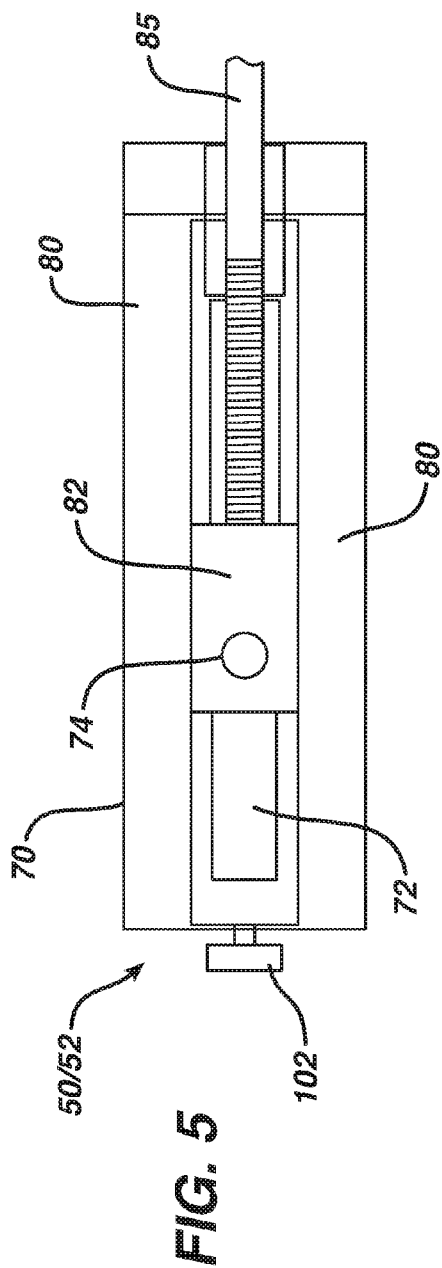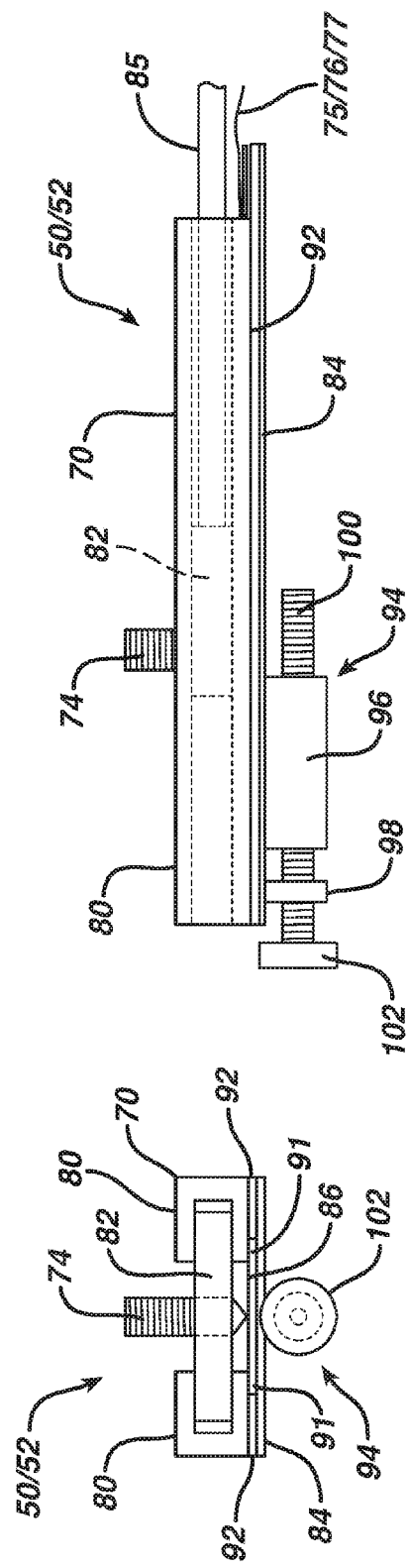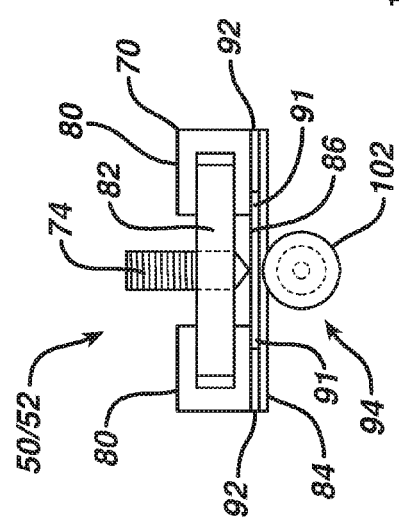

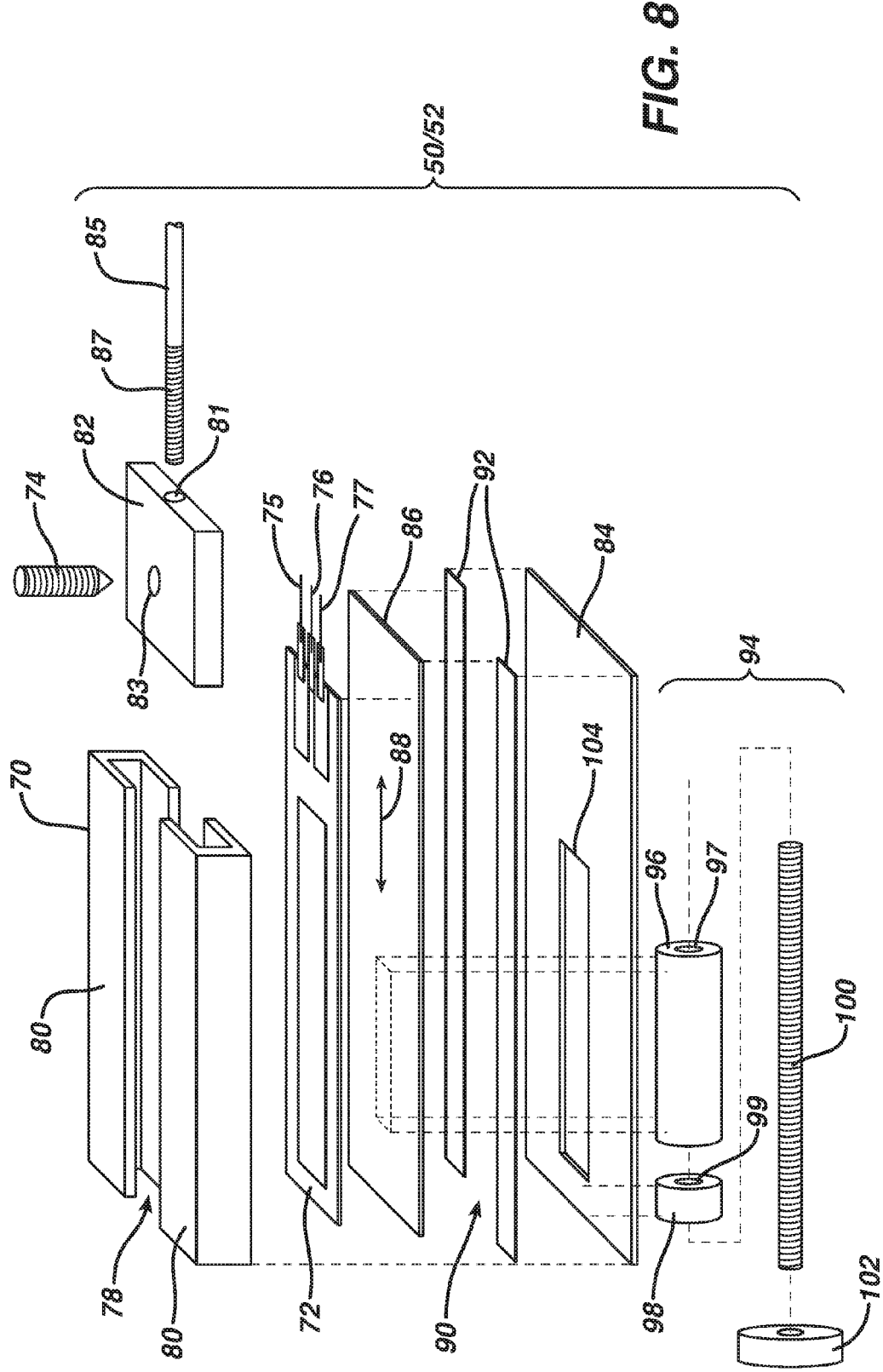

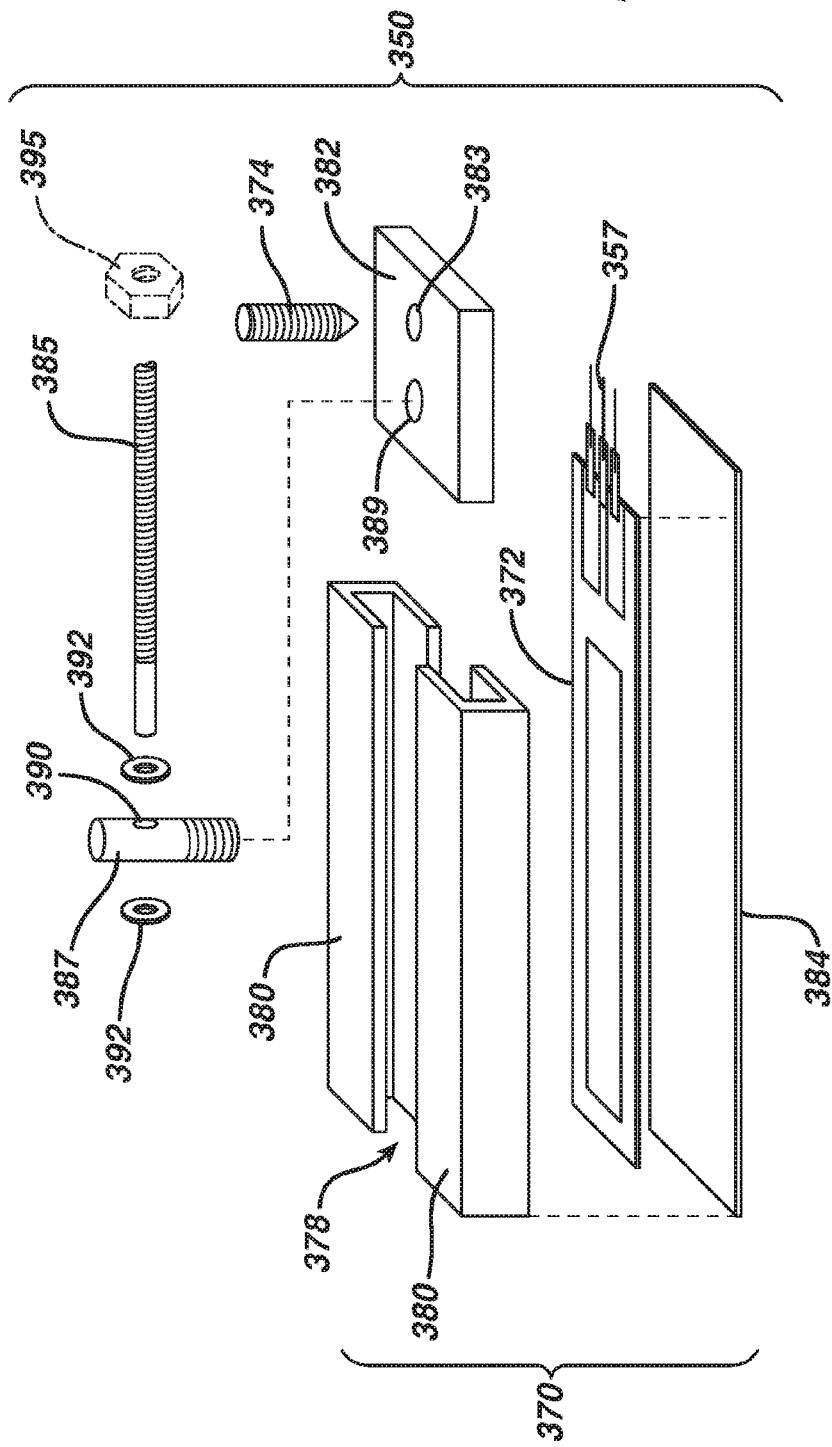

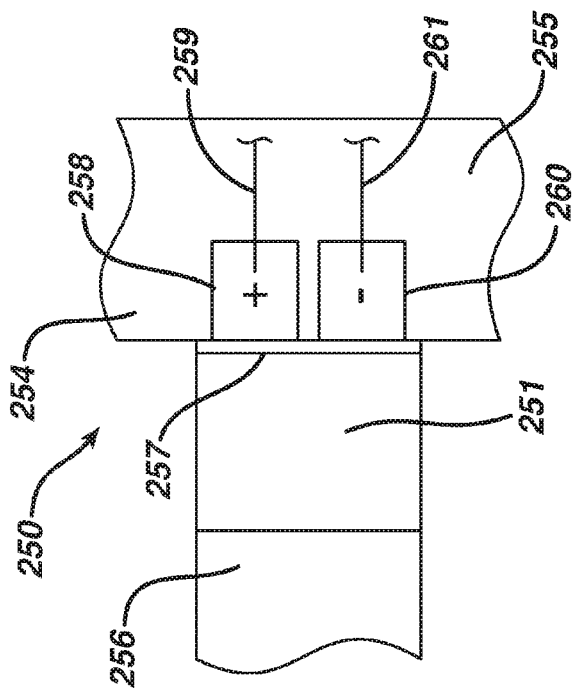
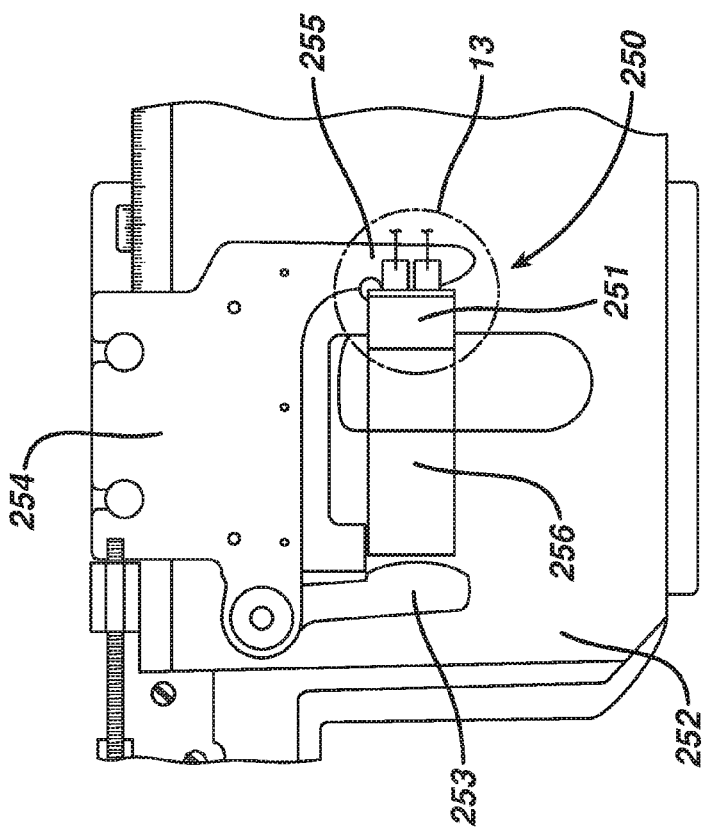

METHODS AND APPARATUS FOR REACQUIRING A TARGET ON A MICROSCOPE SLIDE

BACKGROUND OF THE INVENTION

Technical Field

The present invention is related to the field of microscopes and the locating of targets or specimens in the field of view of microscopes to document the location of a target on a slide. Specifically, aspects of the present invention employ linear potentiometers operatively connected to microscope slides to locate the position of targets on the slides and, among other things, more readily re-acquire the targets for further investigation.

Description of Related Art

Investigators in a broad range of disciplines, for example, medical, biological, pharmacological, genetics, academic (including schools of all levels), and forensics, often use microscopes, including optical, digital, electron, and atomic-force microscopes, to investigate specimens, for example, microbes, blood cells, materials, objects, and the like. However, due to the degree of magnification of existing microscopes, once a target or specimen is located in the field of view of the microscope, it is often difficult to re-locate or re-acquire the target in the field of view, for example, for examination by colleagues or other investigators.

Many prior art attempts have been made to address these specific disadvantages of microscope use, but have been found to be lacking in efficacy and/or repeatability. For example, U.S. Pat. No. 4,374,327 of Christov discloses a method for positioning the stage of an electron microscope. U.S. Pat. No. 9,001,421 of Youn discloses a device for adjusting the magnification of a microscope. The Youn device includes a potentiometer mounted to a rotatable adjuster. U.S. Pat. No. 3,727,051 of Page discloses an electron microscope with an automatically adjustable stage. U.S. Pat. No. 4,442,388 of Phillips discloses a work stage for a semiconductor work piece having an X-Y work stage positioner that uses potentiometers. U.S. Pat. No. 3,779,400 of Brockman, et al. discloses a method and device for positioning a tool by using linear potentiometers. U.S. Pat. No. 5,780,853 of Mori, et al. discloses an electron microscope having a joystick that uses potentiometers to navigate a stage. U.S. Pat. No. 4,833,382 of Gibbs discloses systems positioning microscope slides.

However, despite these and other prior art attempts to facilitate the use of microscopes, there remains a need in the art to provide improved methods, systems, and devices that facilitate and improve the accuracy of the re-acquiring of targets viewed by microscopes.

SUMMARY OF THE INVENTION

Aspects of the present invention employ methods, apparatus, and devices for positioning of a microscope stage that include appropriate mechanical linkages and linear potentiometers for precise locating and/or repositioning of a target or specimen under examination by a microscope.

One embodiment of the invention is an apparatus for locating a target on a slide in a field of view of a microscope, the apparatus comprising or including: a housing; a linear potentiometer positioned in the housing, the linear potentiometer adapted to output a signal; a contact slidably mounted in the housing and adapted to selectively contact the linear potentiometer, wherein a position of the contact on the linear potentiometer determines the signal output by the linear potentiometer; a linkage having a first end operatively connected to the contact and a second end operatively connected to the slide having the target, wherein the slide is translatable in a first direction; and a receiver adapted to receive the signal output by the linear potentiometer and, using the signal, determine a position of the translatable slide. In one aspect, the linear potentiometer may be a membrane-type linear potentiometer.

In another aspect, the apparatus further comprises a slider block adapted to translate within the housing and to retain the contact, and wherein the first end of the linkage is connected to the slider block. In another aspect, the housing comprises a channel adapted to receive the slider block. In one aspect, the linkage comprises at least one rod.

In another aspect, the housing comprises a first housing, wherein the linear potentiometer comprises a first linear potentiometer, wherein the signal comprises a first signal, wherein the contact comprises a first contact, and wherein the linkage comprises a first linkage, and wherein the apparatus may further include: a second housing; a second linear potentiometer positioned in the second housing, the second linear potentiometer adapted to output a second signal; a second contact slidably mounted in the second housing and adapted to selectively contact the second linear potentiometer, wherein a position of the second contact on the second linear potentiometer determines the second signal output by the second linear potentiometer; and a second linkage having a first end operatively connected to the second contact and a second end operatively connected to the slide, the slide translatable in a second direction, different from the first direction.

In one aspect, the receiver may be further adapted to receive the first signal and the second signal and display a first output for the first signal and a second output for the second signal. In one aspect, the receiver may further be adapted to increase a numeric display corresponding to the second signal by 5000 to differentiate the second output from the first output. In another aspect, the receiver may be adapted to change a polarity of at least the second output in response to a detected orientation of the slide.

In another aspect, the second end of the linkage operatively connected to the slide may be operatively connected to a microscope stage holding the slide or operatively connected a microscope slide holder holding the slide.

In a further aspect, the apparatus may include a slide positioning system, for example, having electrical contacts adapted to engage a conductive strip.

Another embodiment of the invention is a method for locating a target on a slide in a field of view of a microscope, the method comprising or including: operatively connecting a contact to the slide on a stage of the microscope; translating the slide, and thereby translating the contact, wherein the target on the slide appears in the field of view of the microscope; visually locating the target in the field of view of the microscope; contacting the contact with a linear potentiometer wherein the linear potentiometer generates an electrical signal corresponding to a position of the contact on the linear potentiometer; and relating the detected position of the contact to a position of the target holder for the target. In one aspect, the method may further comprise recording the detected position of the specimen holder, that is, the position of the specimen holder where the target may be found. In another aspect, the method may further comprise varying the position of the slide, translating the slide and thereby translating the contact to the recorded position of the target, and viewing the target in the field of view of the microscope, for example, re-acquiring the target in the field of view of the microscope.

In one aspect, operatively connecting the contact to the slide on the stage of the microscope may comprise operatively connecting a first contact to the slide on the stage and operatively connecting a second contact to the slide on the stage; wherein translating the slide comprises translating the first contact and the second contact; and wherein contacting the contact with the linear potentiometer comprises contacting the first contact with a first linear potentiometer and generating a first electrical signal corresponding to a position of the first contact and contacting the second contact with a second linear potentiometer and generating a second electrical signal corresponding to a position of the second contact; and wherein relating the detected position of the contact to a position of the slide comprises displaying a first display corresponding to the first electric signal and displaying a second display corresponding to the second electrical signal. In one aspect, the method may further include differentiating the position of the first contact from the position of the second contacting by increasing a numerical display corresponding to the second signal by 5000. In another aspect, the method may further include changing a polarity of at least the second output in response to a detected orientation of the slide.

In one aspect, the practice of operatively connecting the slideable contact to the slide may be performed by operatively connecting the slideable contact to a translatable specimen holder or to a translatable microscope stage. In one aspect, operatively connecting the slideable contact may be practiced with one or more rods.

In another aspect of the invention, the method may further comprise detecting an orientation of the slide having the target or specimen. For example, detecting the orientation of the slide may be practiced by or through or with contacting electrical contacts with a conductive strip. Contacting electrical contacts may be practiced by contacting electrical contacts on a microscope stage with a conductive strip on the slide or contacting electrical contacts on the slide to a conductive strip on the microscope stage.

These and other aspects, features, and advantages of this invention will become apparent from the following detailed description of the various aspects of the invention taken in conjunction with the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention will be readily understood from the following detailed description of aspects of the invention taken in conjunction with the accompanying drawings, in which:

FIG. 5 is a top plan view of one of the potentiometer assemblies shown in FIG. 4.

FIG. 6 is a side elevation view of the potentiometer assembly shown in FIG. 5.

FIG. 7 is a left-side elevation view of the potentiometer assembly shown in FIG. 6.

FIG. 8 is an exploded perspective view of the potentiometer assembly shown in FIGS. 5 through 7.

FIG. 9B is an exploded perspective view of the alternate potentiometer assembly shown in FIG. 9A.

FIG. 12 is top plan view of a slide positioning system according to another aspect of the invention.

FIG. 13 is a detailed view of the slide positioning system shown in FIG. 12 as identified by Detail 13 in FIG. 12.

DETAILED DESCRIPTION OF THE INVENTION

Embodiments of the present invention, in their many aspects, address the disadvantages of prior art methods and systems for locating or re-acquiring targets or specimens located on microscope slides. As known in the art, these "slides" are typically transparent substrates, typically, glass substrates, having specimens mounted on them for viewing by, for example, an optical microscope. However, it is envisioned that aspects of the invention may be adapted and applied for use in any form of viewing or detecting device, including electron microscopes, digital microscopes, and atomic force microscopes, among others. As disclosed herein, aspects of the invention employ the precise positioning capabilities of linear potentiometers, for example, membrane-type linear potentiometers, while providing an interface or connection with the target holder, for example, the microscope slide having the target. Aspects of the invention also provide means and devices for detecting and recording positions of targets and specimens that facilitate and enhance microscope use and operation.

Figure 1:
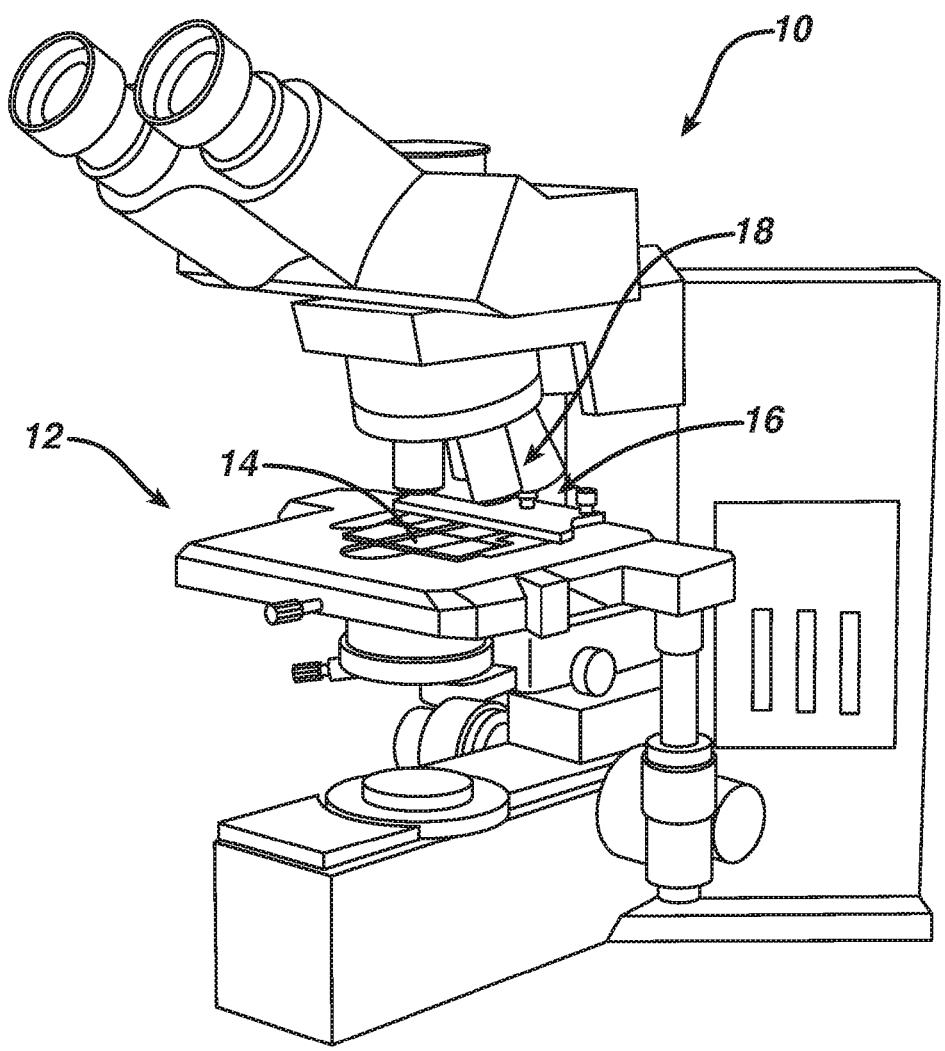
FIG. 1 is a perspective view of an optical microscope having a slide stage according the prior art.

FIG. 1 is a perspective view of an optical microscope 10 having a slide stage assembly 12 according the prior art. Though typical of the prior art, the appearance of microscope 10 shown in FIG. 1 is based upon the design of microscope model BX41 provided by Olympus Corporation. As known in the art, stage 12 typically retains a microscope slide 14, and includes some form of positioning mechanism 16 for positioning the specimen on the slide in the field of view of the optics 18, for example, one or more lenses, of microscope 10. In the prior art microscope 10 represented in FIG. 1, for the sake of illustration, stage 12 mounted on microscope 10 is a stage assembly provided by Olympus Corporation, specifically, a model U-SVRB-4 stage assembly.

Figure 2:
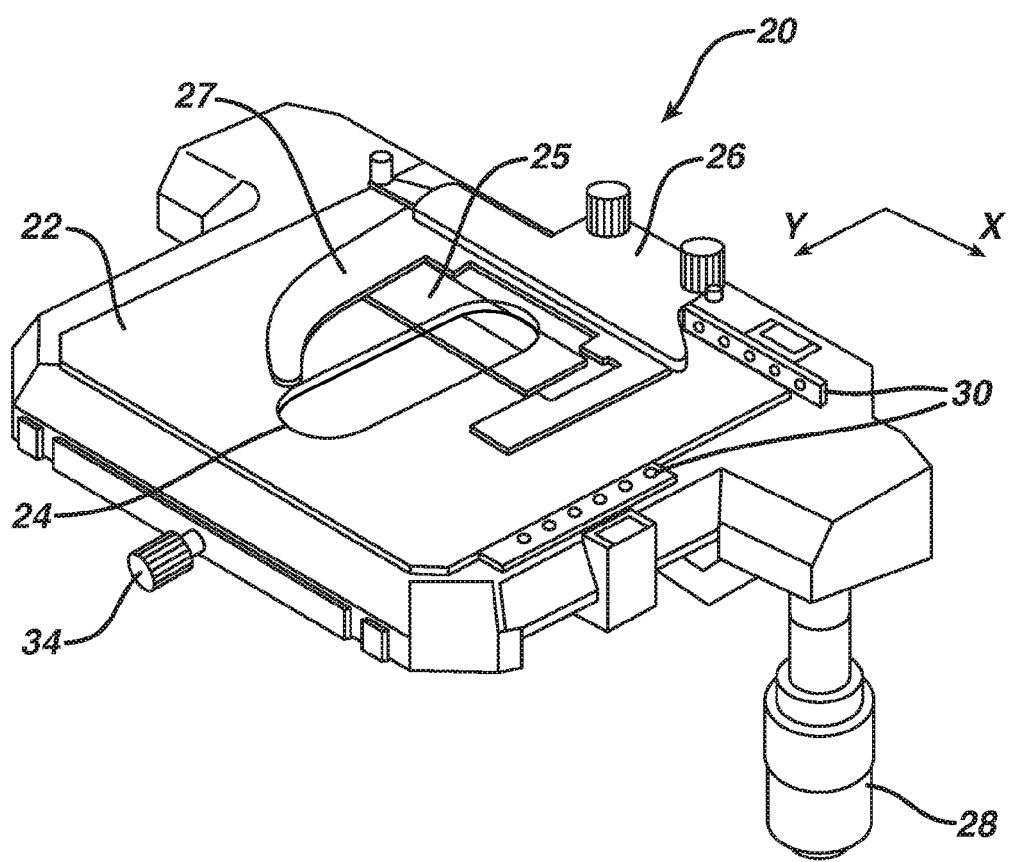
FIG. 2 is a perspective view of one prior art slide stage that may be used for the stage of the microscope shown in FIG. 1.

FIG. 2 is a perspective view of one prior art slide stage assembly 20 that may be used for the slide stage assembly 12 for microscope 10 shown in FIG. 1. As shown in FIG. 2, a typical prior art slide stage assembly 20 includes a translatable planar surface or "stage" 22 having a stage opening 24 positioned to allow illumination to pass to illuminate a slide 25 mounted on stage 22, an adjustable slide holder 26 for retaining slide 25, and control knobs 28 adapted to permit manual translation of the slide holder 26 (and the slide 25 that the holder 26 retains) on the stage 22. For the sake of illustration, stage 22 shown in FIG. 2 is an Olympus model U-SVRB-4 stage assembly. As is typical, slide holder 26 may have one or more adjustable retaining arms 27, typically spring-biased, to retain the slide 25 in slide holder 26. In this prior art stage assembly 20, controls knobs 28 are provided and adapted to translate stage 22 and slide holder 26 in the X and Y directions shown in FIG. 2. As is typical, stage 20 may also include graduated locator markings 30 for use by a microscope operator to locate and/or position the slide 25 on stage 22 and may also include one or more set screws or "stage lock control" knobs 34 to assist in securing stage 20 to microscope 10.

Figure 3:
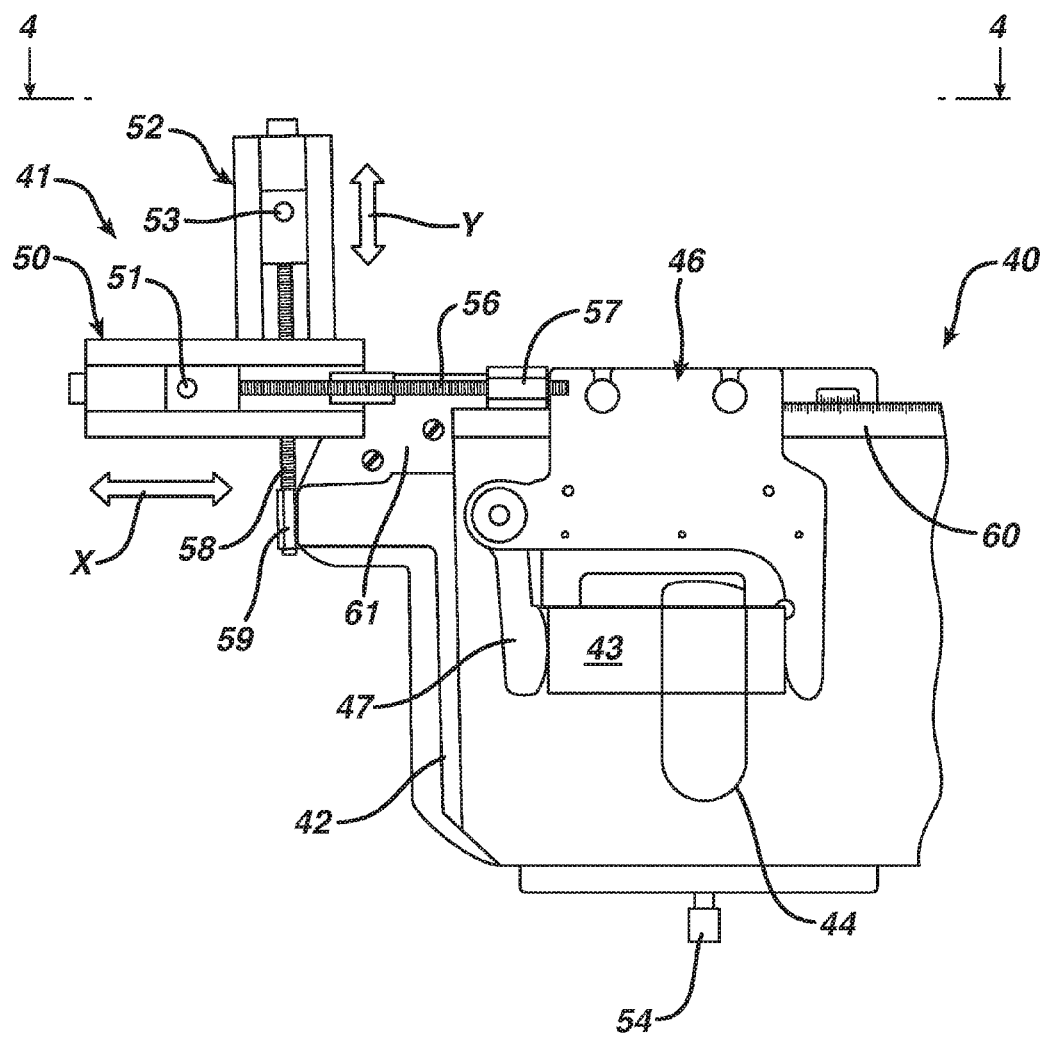
FIG. 3 is a top plan view of a microscope stage having an apparatus for locating a target on a slide in a field of view of a microscope according to one aspect of the present invention.
Figure 4:
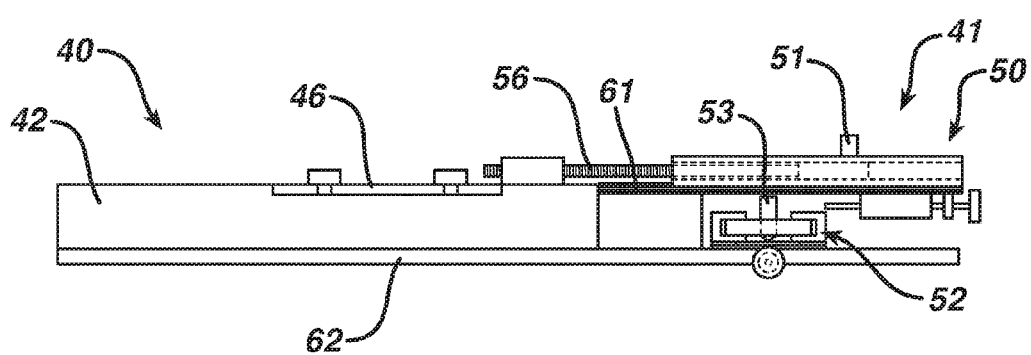
FIG. 4 is a rear elevation view of the stage shown in FIG. 3 as viewed along view lines 4-4 in FIG. 3.

FIG. 3 is a top plan view of a microscope stage assembly 40 having apparatus 41 for locating a target on a slide 43 in a field of view of a microscope (such as microscope 10 shown in FIG. 1) according to one aspect of the present invention. FIG. 4 is a rear elevation view of stage assembly 40 shown in FIG. 3 as viewed along view lines 4-4 in FIG. 3.

Similar to stage assembly 20 shown in FIG. 2, stage assembly 40 in FIG. 3 may have a stage 42 having a stage opening 44, an adjustable slide holder 46 for retaining the slide 43, and control knobs (not shown) adapted to permit manual translation of stage 42 and/or slide holder 46 (and the slide 43) on the stage 42. Slide holder 46 may have one or more adjustable retaining arms 47, typically spring-biased, to retain the slide 43 in slide holder 46. In this aspect, controls knobs (not shown) may be provided and be adapted to translate stage 42 and/or slide holder 46 in the X and Y directions shown in FIG. 3. For the sake of illustration, and in no way limiting the scope of aspects of the invention, stage 42 shown in FIG. 3 (and elsewhere herein) is a modified Olympus model U-SVRB-4 stage assembly, the specification AX9702 01 of which is included by reference herein. (Though FIG. 3 identifies X and Y directions for the sake of illustration, aspects of the invention are not limited to X and Y directions, but may also include a Z direction, for example, substantially perpendicular to the X-Y plane shown in FIG. 3. Aspects of the invention may also be adapted for R-O-Z directions, as desired.) As may be typical, stage 40 may also include graduated locator markings 60 for use by a microscope operator to locate and/or position the slide 43 on stage 42 and may also include one or more set screws or "stage lock control" knobs 54 to assist in securing stage 40 to a microscope, for example, to microscope 10 shown in FIG. 1.

According to aspects of the invention, stage assembly 40 also includes apparatus 41 for locating and/or reacquiring a target on slide 43 in a field of view of a microscope, for example, for locating and documenting a location of a target on slide 43. Apparatus 41 includes at least one, but preferably, at least two, potentiometer assemblies 50 and 52 containing at least one linear potentiometer (not shown) and a potentiometer pointer (contact, stylus, wiper, etc.) 51 and 53, respectively, operatively connected to stage 42 and/or slide holder 46. According to aspects of the invention, potentiometer pointers 51 and 53 of potentiometer assemblies 50 and 52, respectively, may be operatively connected to stage 42 and/or slide holder 46 by any conventional means. For example, pointers 51 and 53 may operatively connected to stage 42 and/or slide holder 46 by one or more appropriate rods, bars, tubing, channels, and/or linkages, and with appropriate fasteners or attachment means, including an adhesive, welding, brazing, or soldering. In one aspect, pointer 51 or 53 and its connection to stage 42 and/or slide holder 46 may comprise a substantially single, integral component, for example, having a pointer portion and a connecting portion, for example, an elongated connecting portion. In the aspect of the invention shown in FIG. 3, potentiometer pointer 51 is operatively connected to slide holder 46 via threaded rod 56 and threaded fastener 57; and potentiometer pointer 53 is operatively connected to stage 42 via threaded rod 58 and threaded fastener 59.

In one aspect of the invention, potentiometer assemblies 50 and 52 of apparatus 41 may be mounted to any convenient surface, for example, to a surface of microscope 10 or to any other conveniently located surface, for instance, to an adjacent jig, fixture, or housing. However, in the aspect shown in FIGS. 3 and 4, potentiometer assemblies 50 and 52 of apparatus 41 are mounted to stage 42. Specifically, though any means of mounting may be provided to position potentiometer assemblies 50 and 52 on stage 42, in the aspect shown, potentiometer assembly 50 is mounted to stage 42 by a plate 61 and housing 52 is mounted to stage 42 by bar 62 (see FIG. 4), for example, with the use of mechanical fasteners. According to aspects of the invention, potentiometer assemblies 50 and 52 may be mounted to microscope 10, stage 42, and/or any convenient surface or structure by conventional means, for example, with one or more plates, one or more bars, and/or by a plurality of mechanical fasteners, an adhesive, brazing, soldering, and/or welding.

FIG. 5 is a top plan view of the potentiometer assembly 50 or 52 shown in FIG. 4. FIG. 6 is a side elevation view of the potentiometer assembly 50 or 52 shown in FIG. 5. FIG. 7 is a left-side elevation view of the potentiometer assembly 50 or 52 shown in FIG. 6. FIG. 8 is an exploded perspective view of the potentiometer assembly 50 or 52 shown in FIGS. 5 through 7.

As shown in FIGS. 5 through 8, potentiometer assembly 50/52 includes a housing 70 containing a linear potentiometer 72. The housing 70 is typically adapted to receive a potentiometer pointer, stylus, contact, or "wiper" 74 shaped and positioned to engage potentiometer 72. Linear potentiometer 72 typically includes two or more electrical signal outputs, pins, or contacts 75, 76, and 77, which are adapted to receive an electrical signal from potentiometer 72 and output an electrical signal based upon the positioning of pointer 74 along potentiometer 72. For example, in one aspect, pin 75 may receive power, for example, a DC voltage; pin 76 may be a "collector" from which an output from potentiometer 72 may be obtained (for example, for input to a receiver 210, see FIG. 10); and pin 77 may be a ground. For example, in one aspect, pointer 74 may comprise a threaded rod having a resilient tip, for example, a spring-biased tip. Pointer 74 may be conductive or non-conductive. According to the broadest aspect of the invention, housing 70 is adapted to retain linear potentiometer 72 and housing 70 is adapted to receive and position pointer 74 so that pointer 74 contacts linear potentiometer 72 while allowing translation of pointer 74. In one aspect, pointer or wiper 74 (and any other pointer or wiper disclosed herein) may selectively engage or be contacted with linear potentiometer 72, for example, manually or automatically selectively engaged and disengaged, such as, for "quick" engagement and disengagement. For instance, in one aspect, pointer or wiper 74 may include a spring- or elastomer-biased pin or point adapted to engage and disengage potentiometer 72, for example, by compressing a spring-biased pin or deflecting an elastomer-biased lever. In one aspect, the engagement and disengagement of pointer or wiper 74 with potentiometer 72 may include a detent or locking device adapted to, for example, when activated, engage and maintain engagement of pointer 74 with potentiometer 72 until the detent is disengaged, for example, manually disengaged. According to an aspect of the invention, with the translation of pointer 74, the electrical signal output from potentiometer 72 to outputs or contacts 75, 76, and/or 77 varies. According to one aspect of the invention, any form of structure for housing 70 may be used to affect the desired function and result. One housing and potentiometer arrangement that has been proven to be effective in this regard is illustrated in FIGS. 5 through 8.

As shown in FIGS. 5 through 8, housing 70 may comprise a slot or cavity 78 adapted to receive pointer 74. For example, as shown, in one aspect, housing 70 may comprise a set of opposing channels 80 positioned and sized to receive a pointer holder or "slider" 82 having pointer 74. Pointer 74 may be positioned in pointer holder 82 by conventional means, for example, with an adhesive, mechanical fasteners, or welding. As shown in FIG. 8, pointer 74 may comprise a threaded rod that engages one or more threaded holes 83, for instance, threaded through holes, in pointer holder 82. In another aspect, pointer 74 may be rigidly mounted to pointer holder 82, for example, by mechanical fasteners, by welding, or integrally formed with pointer holder 82 as a single integral component.

According to one aspect of the invention, pointer holder 82 having pointer 74 is adapted to translate within housing 70, for example, within channels 80, with the translation of stage 42 and/or slide holder 46 in FIGS. 3 and 4. Accordingly, according to aspects of the invention, pointer holder 82 is operatively connected to stage 42 and/or slide holder 46 and pointer holder 82 may translate in response to the translation of stage 42 and/or slide holder 46. In one aspect, pointer holder 82 may be operatively connected to stage 42 and/or slide holder 46 by any conventional means, for example, with any type of hardware and/or fasteners. In the aspect of the invention shown in FIGS. 5-8, pointer holder 82 is operatively connected to stage 42 and/or slide holder 46 by means of a linkage, for example, one or more rods 85. One or more rods 85 may be bars, unthreaded rods, threaded rods, or tubing, or the like. As shown in FIG. 8, in one aspect, rod 85 may be an at least partially threaded rod having at least one threaded end 87 adapted to engage threaded hole 81 in pointer holder 82.

As shown in FIGS. 3 and 4, the linkage between pointers 51 and 53 to stage 42 and/or slide holder 46 may comprise one or more rods 56 or 58. As also shown in FIGS. 3 and 4, rod 56 (85 in FIG. 5) may be mounted to slide holder 46 and rod 58 (85) may be mounted to stage 42 using conventional hardware, for example, the internally threaded tubes 57 and 59, respectively, shown in FIG. 3. Internally threaded tubes 57 and 58 may be mounted to stage 42 by conventional means, including with an adhesive, soldering, welding, or with mechanical fasteners.

As also shown in FIGS. 5 through 8, housing 70 may also include a bottom plate or "base plate" 84 to which channels 80 may be mounted, for example, by mechanical fasteners, an adhesive, soldering, or welding. In one aspect of the invention, channels 80 defining slot 78 may be integrally formed with base plate 84, for example, formed as an extrusion or casting.

As shown in FIGS. 5-8, potentiometer 72 may comprise an elongated structure adapted and sized to be received by housing 70. According to aspects of the invention, potentiometer 72 may be any form of linear electrical element or device adapted to output an electrical signal based upon the location of pointer 74, or a device of similar function. In one aspect, potentiometer 72 may comprise a "membrane-type" potentiometer. When potentiometer 72 comprises a membrane-type potentiometer, pointer 74 may be adapted to deflect a membrane of potentiometer 72 which results in contact between conductive material to generate an output signal corresponding to or associated with the position of pointer 74 along the length of membrane-type potentiometer 72. Though other types of membrane potentiometers may be used, in one aspect, potentiometer 72 comprises a membrane-type potentiometer provided by Spectra Symbol of Salt Lake City, Utah. For example, potentiometer 72 may comprise a Specta Symbol "ThinPot" potentiometer, as disclosed in Spectra Symbol's data sheet "Diagrams and Schematics," which is included by reference herein.

As also shown in FIGS. 5 through 8, potentiometer assembly 50/52 may be adapted to receive and utilize potentiometer 72. For example, in one aspect, potentiometer assembly 50/52 may include a substrate or plate 86 adapted and positioned to receive potentiometer 72. For example, potentiometer 72 may be mounted to plate 86, for example, with an adhesive or mechanical fasteners, and plate 86 may translate within or upon housing 70, for example, as indicated by double arrow 88 in FIG. 8. The translation or sliding of plate 86 and potentiometer 72 may provide the capability of varying or regulating the output of potentiometer 72, for example, to normalize or "zero" the output for subsequent reference. In one aspect, plate 86, which may be referred to as a "sliding bar," may be adapted to slide within or upon housing 70, for example, plate 86 may comprise a friction-reducing material, for example, a PTFE-containing material, for instance, a DuPont TEFLON® PTFE or a Saint-Gobain RULON® PTFE, or their equivalents.

As shown most clearly in FIG. 8, in one aspect, housing 70 may be adapted to receive and/or accommodate the translation or sliding of plate 86. For example, as shown in FIG. 8, housing 70 may comprise a channel 90 that receives and/or guides the movement of plate 86 upon which potentiometer 72 is mounted. In one aspect, channel 90 may be defined by guide plates or "spacer strips" 92, for example, plates 92 may be mounted to base plate 84 and be positioned and sized to receive and guide the translation of plate 86. In one aspect, plates 92 may be mounted to base plate 84 by an adhesive, by mechanical fasteners, soldering, or by welding. In one aspect of the invention, spacer strips 92 may be integrally formed with base plate 84, for example, machined into base plate 84 or formed as an extrusion or casting with base plate 84. In one aspect, the width of each spacer strip 92 may be narrower than the width of each channel 80. As shown most clearly in FIG. 7, when spacer strips 92 are narrower in width than the width of channel 80, the difference in width can provide cavities 91 (for example, a pair of opposing cavities 91) between the bottom of each channel 80 and the top of each base plate 84 which provide at least some retention of sliding bar 86. For example, at least a portion of the bottom of each channel 80 and at least a portion of the top of plate 84 may provide vertical retention of sliding bar 86, and the internal edges of spacer strips 92 may provide lateral retention of siding bar 86, while permitting longitudinal movement of sliding bar 86.

As also shown in FIGS. 5 through 8, potentiometer assembly 50/52 may also be adapted to vary or regulate the position of sliding bar 86 and the potentiometer 72 mounted to sliding bar 86. For example, in one aspect, potentiometer assembly 50/52 may include an adjustment assembly 94 adapted to vary the position of sliding bar 86 and potentiometer 72, for example, to vary the output of potentiometer 72, for instance, to normalize or "zero" the output for subsequent reference. Though various means of adjusting the position of potentiometer 72 and various adjustment mechanisms may be used, in one aspect, as shown in FIG. 8, adjustment assembly 94 may include a adjustment tube or block 96, a rod mounting tube, block, or "rod holder" 98, an adjustment rod 100, and an adjustment knob 102. As shown, adjustment tube or block 96 may typically be mounted, for example, substantially rigidly mounted with an adhesive, mechanical fasteners, soldering, or welding, and the like, to sliding bar 86. For instance, adjustment tube 96 may access sliding bar 86 via a slot or opening 104 in base plate 84. Adjustment tube or block 96 may typically include a hole 97, for example, a threaded hole adapted to engage the threads on adjustment rod 100. Rod mounting tube or block 98 may typically be mounted, for example, substantially rigidly mounted with an adhesive, mechanical fasteners, soldering, or welding, and the like, to base plate 84. Rod mounting tube or block 98 may typically include a hole 99, for example, a through hole adapted to receive and support adjustment rod 100. Adjustment rod 100 may comprise a metallic threaded rod, for example, having course threads (UNC) or fine threads (UNF), and threadably engage complementary threaded hole 97 in adjustment block 96. Adjustment knob 102 may be any structure that facilitates the handling and rotation, for example, fine rotation, of adjustment rod 100.

In one aspect, as shown in FIG. 8, adjustment knob 102 may be a metallic or plastic disk or plate, for instance, having a knurled outer diameter or surface adapted to facilitate handling by an operator. In another aspect, adjustment knob 102 may comprise a lever arm mounted to adjustment rod 100. The deflection of the lever arm, for example, automated or manual deflection, may rotate adjustment rod 100 to translate potentiometer 72 as desired. It is also envisioned that the rotation of adjustment rod 00 may be effected automatedly in addition to manually. For example, adjustment rod 100 may be operatively connected to a rotational actuator, for example, a stepper motor, adapted to rotate rod 00 in response to user input, for example, user input to an electronic controller (not shown) operatively connected to a stepper motor.

It is also envisioned that the translation of plate 86 with potentiometer 72 may be practiced using a linear actuator operably connected to plate 86. For example, in one aspect, a pneumatic actuator, a hydraulic actuator, a mechanical actuator, or an electrical actuator, such as, a linear position transducer, may be used in place of or in addition to adjustment assembly 94. Further, it is envisioned that one or more of these transducers may translate plate 86 in response to user input, for example, user input to an electronic controller (not shown) operatively connected to the transducer.

Figure 9:
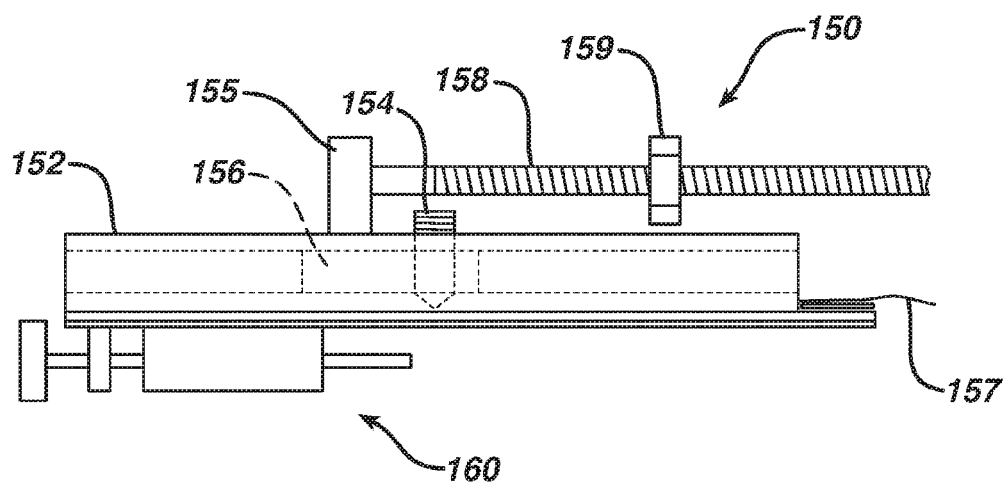
FIG. 9 is a side elevation view, similar to FIG. 6, of another potentiometer assembly according to an aspect of the invention.

FIG. 9 is a side elevation view, similar to FIG. 6, of another potentiometer assembly 150 according to an aspect of the invention. Potentiometer assembly 150 may be very similar to assembly 50/52 shown in FIGS. 5-8. Potentiometric assembly 150 may include a housing 152 (for example, similar to housing 70), a pointer 154 (for example, similar to pointer 74), a pointer holder 156 (for example, similar to pointer holder 82); a linkage 158 (for example, similar to linkage 85), a linear potentiometer (not shown, for example, similar to linear potentiometer 72) having outputs 157, and an adjustment assembly 160 (for example, similar to adjustment assembly 94). According to the aspect shown in FIG. 9, in contrast to the aspect shown in FIGS. 5 through 8, one end of linkage 158 of potentiometer assembly 150 is operatively connected to stage 42 and/or slide holder 46 (see FIGS. 3 and 4), and another end of linkage 158 engages pin 155, that is, instead of engaging pointer holder 156. In the aspect shown in FIG. 9, pin 155 is mounted and/or attached to pointer holder 156, for example, threaded into pointer holder 156. According to this aspect, linkage 158, for example, one or more rods, may engage pin 155 by conventional means, for example, with mechanical fasteners. In one aspect, linkage 158 may be rotatably mounted to pin 155, where linkage 158 may rotate about a centerline of linkage 158 while engaged with pin 155. According to this aspect of the invention, the translation of linkage 158 (for example, induced by the rotation of nut 159 rigidly mounted to linkage 158) also translates pointer holder 156 and pointer 154 mounted in pointer holder 156. In one aspect, in lieu of or in conjunction with adjustment assembly 160, potentiometer assembly 150 may include an adjustment mechanism comprising linkage 158. In one aspect, linkage 158 may be a threaded rod that may threadably engage slide holder 46 or stage 42 (not shown), for example, by means of a threaded fastener. According to this aspect, the rotation of threaded rod 158, for example, by nut 159 fixed to rod 158 or a similar structure fixed to rod 158, translates pointer 154 along the linear potentiometer to, among other things, vary the location of pointer 154 and thus vary the output of the potentiometer, for example, to normalize or "zero" the output of the potentiometer. Though not illustrated in FIG. 9, it is envisioned that, with omission of adjustment mechanism assembly 160, the structures associated with adjustment mechanism 160, for example, plate 86, spacer strips 92, and/or slot 104 shown in FIG. 8, may be omitted. For instance, as suggested by the arrangement shown in FIG. 8, potentiometer 72 may be mounted directly to base plate 84.

Figure 9A:
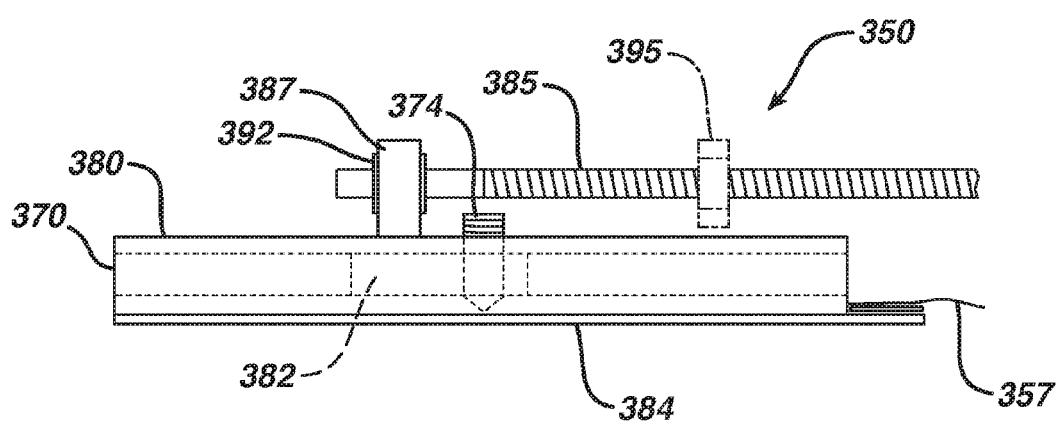
FIG. 9A is a side elevation view of an alternate potentiometer assembly that may be used for the potentiometer assemblies shown in FIG. 3.

FIG. 9A is a side elevation view of an alternate potentiometer assembly 350 that may be used for the potentiometer assemblies 50 and/or 52 shown in FIG. 3. FIG. 9B is an exploded perspective view of the alternate potentiometer assembly shown in FIG. 9A. As shown, potentiometer assembly 350 includes a housing 370 containing a linear potentiometer 372 (see FIG. 9B), for example, a potentiometer substantially the same as potentiometer 72 shown in and described with respect to FIGS. 5 through 8. The housing 370 may be similar to housing 70 disclosed herein and is typically adapted to receive a potentiometer pointer, stylus, contact, or "wiper" 374 shaped and positioned to engage potentiometer 372. As described herein, pointer 374 may comprise a threaded rod having a resilient tip, for example, a spring-biased tip. Linear potentiometer 372 typically includes one or more electrical signal outputs or contacts 357, which are adapted to receive an electrical signal from potentiometer 372 and output an electrical signal based upon the positioning of pointer 374 along potentiometer 372, as described herein. According to the broadest aspect of the invention, housing 370 is adapted to retain linear potentiometer 372, and housing 370 is adapted to receive and position pointer 374 so that pointer 374 contacts linear potentiometer 372 while allowing translation of pointer 374.

As shown in FIG. 9B, housing 370 may comprise a slot or cavity 378 adapted to receive pointer 374. For example, as shown, in one aspect, housing 370 may comprise a set of opposing channels 380 positioned and sized to receive a pointer holder or "slider" 382 carrying pointer 374. Pointer 374 may be positioned in pointer holder 382 by conventional means, for example, with an adhesive, mechanical fasteners, or welding. As shown in FIG. 9B, pointer 374 may comprise a threaded rod that engages one or more threaded holes 383, for instance, threaded through holes, in pointer holder 382.

According to one aspect of the invention, pointer holder 382 having pointer 374 is adapted to translate within housing 370, for example, within channels 380, with the translation of stage 42 and/or slide holder 46, shown in FIGS. 3 and 4. Accordingly, according to aspects of the invention, pointer holder 382 and pointer 374 are operatively connected to stage 42 and/or slide holder 46, and pointer holder 382 and pointer 374 may translate in response to the translation of stage 42 and/or slide holder 46. In one aspect, pointer holder 382 may be operatively connected to stage 42 and/or slide holder 46 by any conventional means, for example, with any type of hardware and/or fasteners. In the aspect of the invention shown in FIGS. 9A and 9B, pointer holder 382 is operatively connected to stage 42 and/or slide holder 46 by means of a linkage, for example, one or more rods 385 operatively connected to stage 42 and/or slide holder 46. One or more rods 385 may engage pin 387 mounted to pointer holder 382. Pin 387 may be at least partially threaded and adapted to threadably engage one or more threaded holes 389 in pointer holder 382. In another aspect, pin 387 may be rigidly mounted to pointer holder 382, for example, by mechanical fasteners, by welding, or integrally formed with pointer holder 382 as a single integral component. One or more rods 385 may be bars, unthreaded rods, threaded rods, or tubing, or the like. As shown in FIGS. 9A and 9B, in one aspect, rod 385 may engage pin 387 where rod 385 is received by a through hole 390 in pin 387 and may be retained in through hole 390 by conventional means. For example, in one aspect, as shown, rod 385 may be retained in through hole 390 of pin 387 by a pair of retaining rings or washers 392. For instance, rings 392 may each be a retaining washer, a retaining ring, or a push nut, as known in the art, among other types of conventional fasteners. For example, rings 392 may each be a metallic retaining washer, retaining ring, or push nut, for example, having internal prongs that engage rod 385. In one aspect, rod 385 rotatably engages pin 387, for example, where rod 385 is allowed rotate within through hole 390.

As shown in FIGS. 3 and 4 above, the linkage between pointer 374 in potentiometer assembly 350 (in FIGS. 9A and 9B) and stage 42 and/or slide holder 46 may comprise one or more rods 56 or 58. As also shown in FIGS. 3 and 4, rods 56 and 58 (which may correspond with rod 385 in FIGS. 9A and 9B) may be mounted to slide holder 46 and/or stage 42 using conventional hardware, for example, the internally threaded tubes 57 and 59, respectively, shown in FIG. 3.

As also shown in FIGS. 9A and 9B, housing 370 may include a bottom plate or "base plate" 384 to which channels 380 may be mounted, for example, by mechanical fasteners, an adhesive, soldering, brazing, or welding. In one aspect of the invention, channels 380 defining slot 378 may be integrally formed with base plate 384, for example, formed as an extrusion or casting.

As shown in FIGS. 9A and 9B, potentiometer 372 may comprise an elongated structure, as disclosed herein, adapted and sized to be received by housing 370, and may be any form of linear electrical element or device adapted to output an electrical signal based upon the location of pointer 374, or a device of similar function, as disclosed herein. For example, potentiometer 372 may be a "membrane-type" potentiometer, such as, a membrane-type potentiometer provided by Spectra Symbol, as disclosed herein.

As also shown in FIGS. 9A and 9B, potentiometer assembly 350 may also be adapted to vary or regulate the position of pointer 374 within potentiometer assembly 350. For example, in one aspect, potentiometer assembly 350 may be adapted to vary the position of pointer 374, for example, relative to stage 42 and/or slide holder 46 (see FIG. 3). For instance, in one aspect, potentiometer assembly 350 may include an adjusting lever or nut 395 (shown in phantom in FIGS. 9A and 9B) mounted to rod 385, where rod 385 rotates with the rotation of lever or nut 395. Lever or nut 395 may be mounted, for example, rigidly mounted, to rod 385 by conventional means, for example, with an adhesive, soldering, brazing, or welding. In one aspect, the rotation of rod 385 with lever or nut 395 may be used to vary the relative position of pointer 374 along potentiometer 372 with respect to stage 42 and/or slide holder 46. For example, due to a threaded engagement of rod 385 with a threaded fastener mounted to stage 42 and/or slide holder 46 (such as, the internally threaded tubes 57 and 59 shown in FIG. 3), the rotation of lever or nut 395 may translate the position of pointer 374 relative to stage 42 and/or slide holder 46. In one aspect, the rotation of lever or nut 395 may be used to vary the output of potentiometer 72, for instance, to normalize, or "zero" the output for subsequent reference.

In one aspect, adjustment lever or nut 395 may be a metallic or plastic disk or plate, for instance, having a knurled outer diameter or surface adapted to facilitate handling by an operator. In another aspect, nut 395 may comprise a lever arm mounted to rod 385. The deflection of the lever arm, for example, automated or manual deflection, may rotate rod 385 to translate pointer 374 as desired. It is also envisioned that the rotation of lever or nut 395 may be effected automatedly in addition to manually. For example, lever or nut 395 may be operatively connected to a rotational actuator, for example, a stepper motor, adapted to rotate lever or nut 395 in response to user input, for example, user input to an electronic controller (not shown) operatively connected to a stepper motor (not shown).

Figure 10:
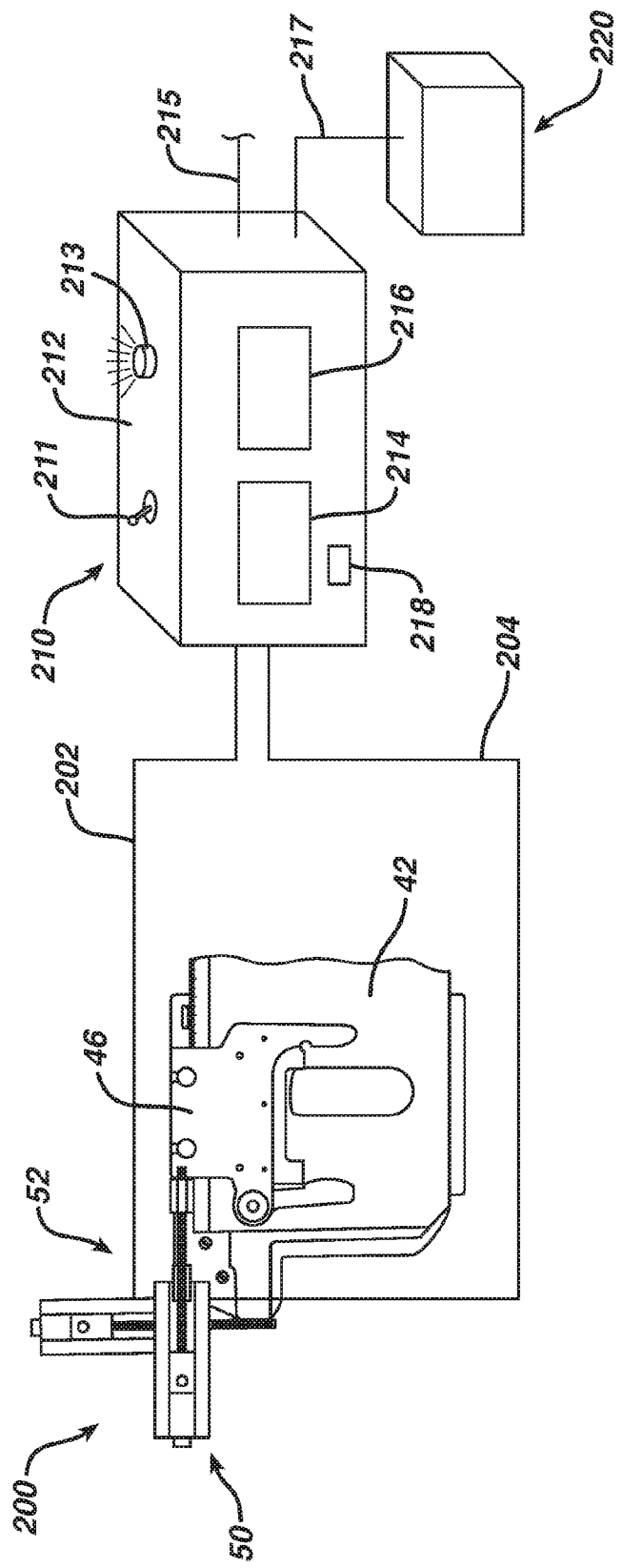
FIG. 10 is a schematic view of a system comprising aspects of the present invention.

FIG. 10 is schematic view of a system 200 comprising aspects of the present invention. As shown, system 200 typically includes a microscope stage 42 having slide holder 46 (as shown in FIG. 3); potentiometer assemblies 50 and 52 (as shown in FIGS. 3 through 9B); and a receiver and/or display 210 electrically connected to the potentiometer assemblies 50 and 52.

As shown, with translation of stage 42 and/or slide holder 46 and the corresponding deflection of the pointers in potentiometer assemblies 50 and 52 as disclosed herein, the potentiometers in potentiometer assemblies 50 and 52 output electrical signals via electrical connections 202 and 204 in FIG. 10. For example, electrical connections 202 and 204 may be electrically coupled to one or more of contacts 75, 76, and 77 shown in FIGS. 6 and 8. In one aspect, connections 202 and 204 may be wired or wireless connections from, for example, at least one of the contacts 75, 76, and 77 shown in FIGS. 6 and 8. Connections 202 and 204 may include multiple connections or wires, and one of these connections may transmit power from receiver 210 to potentiometer assemblies 50 and 52, for example, to power potentiometer 72. According to one aspect of the invention, the signals transmitted by connections 202 and 204 are received by receiver 210 and manipulated, displayed, printed, and/or output, as desired.

Receiver 210 includes a housing 212 and various signal input, manipulation, storage, and/or output devices. For example, receiver 210 may include one or more displays 214 and 216, for example, digital displays adapted to display numerals, and a power switch 218. Receiver 210 may also include one or more switches or buttons, and the like, for example, one or more toggle switches 211, for instance, a toggle switch adapted to change the displayed polarity of the detected location output by potentiometer 72, as disclosed herein, for example, in response to the orientation of the slide 43 on stage 42. In other aspects of the invention, displays 214 and 216 may be graphic displays adapted to display images, for example, images associated with the electrical signals received via connections 202 and 204. For example, in one aspect, where the signals received from connections 202 and 204 are associated with the location of the pointers on the potentiometers in potentiometer assemblies 50 and 52, receiver 210 may be adapted to display locations, for example, in numeric, alphabetic, or alphanumeric characters without units of measure or with units of measure, for instance, in inches (in.) or millimeters (mm), on displays 214 and 216. Receiver 210 may typically receive power via electrical connection 215 and may transmit an output signal via connection 217, for example, to an external device 220, for instance, a display, a printer, a storage device, or a transmitter (such as, a transmitter adapted to transmit a wireless signal). In one aspect, external device 220 may be a router or server adapted to transmit and/or receive signals from a network, such as, the Internet. Receiver 210 may also include one or more indicators or lights 213, for example, to, among other things, advise a user of the orientation of a slide on the slide holder or the polarity of the data displayed on displays 214 and/or 216. (See the discussion of FIGS. 12 and 13.)

Figure 11:
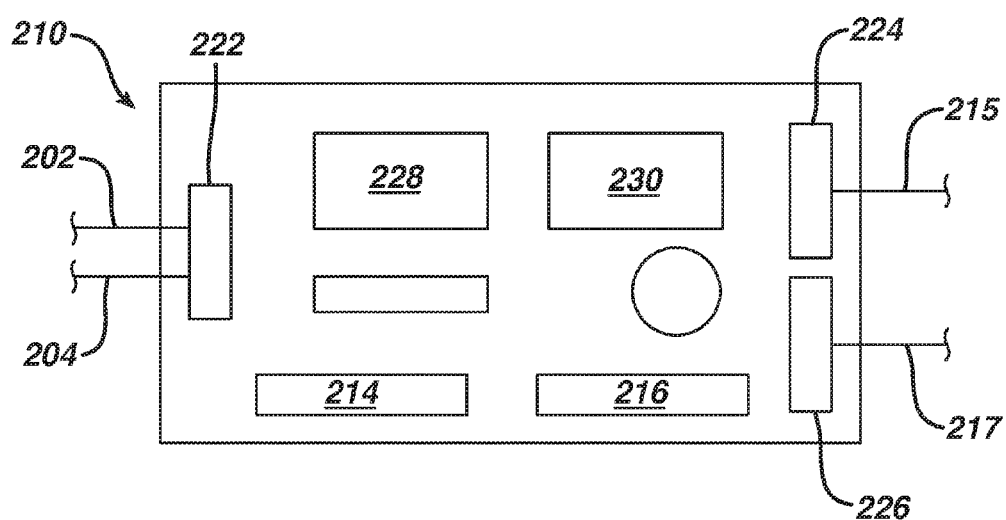
FIG. 11 is a schematic plan view of the internal components of the receiver shown in FIG. 10 according to one aspect of the invention.

FIG. 11 is a schematic plan view of one set of contents of receiver 210 shown in FIG. 10 according to one aspect of the invention. As shown in FIG. 11, receiver 210 may include an input module 222 adapted to receive signals via connections 202 and 204, displays 214 and 216, a power supply 224 connected to power connection 215, and one or more output modules 226 adapted to transmit signals via connection 217, as discussed with respect to FIG. 10 above. In one aspect, input module 222 may be a relay, for example, a 6-VDC, 4-pole, double-throw relay, for instance a relay provided by IDEC Corporation, or its equivalent. As shown in FIG. 11, receiver 210 may also include one or more processors 228 and/or one or more storage devices 230, among other components, which may be operatively connected or electrically connected to input module 222 and/or output module 226. Other electrical components that may be found in receiver 210 will be apparent to those of skill in the art.

With reference to the aspects of the invention illustrated in FIGS. 3 through 11, according to one aspect of the invention, an apparatus 41 for locating or reacquiring a target on a slide 43 in a field of view of a microscope 10 is provided. The apparatus 41 includes one or more potentiometer assemblies 50 and 52. Each of the potentiometer assemblies 50 and 52 includes a housing 70; a linear potentiometer 72 positioned in the housing 70, the linear potentiometer 72 adapted to output a signal, via wires 75, 76, and/or 77; a contact or "pointer" 74 slidably mounted in the housing 70 and adapted to contact, for example, selectively contact, the linear potentiometer 72, wherein a position of the contact 74 on the linear potentiometer 72 determines the signal output by the linear potentiometer 72; and a linkage 85 having a first end operatively connected to the contact 74 and a second end operatively connected to translatable stage 42 or to a translatable slide holder 46 mounted to the stage 42. According to aspects of the invention, the translatable slide holder 46 holding the slide 43 having the target or the translatable stage 42, or both, are translatable in a first direction. The apparatus may include a receiver 210 (see FIG. 10) adapted to receive the signal output by the linear potentiometer 72 and, using the signal, determine a position of the translatable specimen holder 74 on the stage 42 of the microscope 10. In one aspect, the position determined may be displayed on a display 214 or 216, for example, a display positioned in receiver 210, or otherwise stored and/or recorded, for example, written down.

In one aspect of the invention, potentiometer 72 may be powered with a voltage, for instance, about 5 volts [V], for example, via a wire provided to potentiometer 72 from receiver 210 via connection 202 or 204. According to one aspect, the sensitivity of some potentiometers 72 may be a function of the voltage with which the potentiometer is powered. It is envisioned that an optimal voltage for a given potentiometer can be determined which will enhance accuracy while maximizing sensitivity. According to aspects of the invention, the term "sensitivity" is used to mean that aspects of the invention improve the accuracy of the detection of the position of the target on the slide. In one aspect, a 5 V voltage may in effect be an actual voltage of 5000 millivolts [mV], and the full-scale location of slider 74 along potentiometer 72 may correspond to 5000 mV. Accordingly, in one aspect, the reading displayed on displays 214 and 216 may comprise a numerical reading ranging from 0000 to 5000 (or 4999), that is, corresponding to the millivolt voltage detected between slider 74 and potentiometer 72 that corresponds to the location of slider 74. In one aspect, the voltage ranging from 0000-5000 may be the reading displayed on displays 214 and 216 that is used to re-position a slide and re-acquire the target of interest on a slide; for example, the readings on displays 214 and 216 may not correspond to a location, but may correspond to the output of potentiometer 72, for example, the output voltage of potentiometer 72. In another aspect, the reading displayed on displays 214 and 216 may correspond to a dimension, for example, a proportional dimension computed from the output of potentiometer 72, for example, the voltage output by potentiometer 72 and the active length of potentiometer 72, for example, 3 to 6 inches.

According to one aspect of the invention, the output of displays 214 and 216 may be adapted to facilitate differentiation of a location detected by one potentiometer assembly 50 or 52 from the location detected by the other potentiometer assembly 50 or 52. For example, in one aspect, displays 214 and 216 may be appropriately labeled, for example, with the labels "X Location" and "Y Location." In another aspect, the displays themselves may include prefixes for the location detected, for example, the displays may include the prefixes "X=" and "Y=." In another aspect, the one or more signals received from potentiometer assembly 50 or 52 may be modified, for example, prior to display on displays 214 and 216, to distinguish the direction (for example, X or Y) of the location represented by the displayed location. For example, in one aspect, the polarity of the signal transmitted by potentiometer assembly 50 or 52 may be modified or changed to distinguish one direction of a displayed dimension from another. For instance, aspects of the invention may include changing the polarity of a signal, for example, the signal transmitted from potentiometer assembly 52, from a "positive" voltage, for example, "4445" mV to a "negative" voltage, for example, "−4445" mV, or vice versa, in order to distinguish one direction (for example, the Y direction) from the other direction (for example, the X direction) of the displayed location. This change in the displayed polarity of the transmitted voltage may be provided by software (for example, software operating on processor 228 of receiver 210 shown in FIG. 11.) or by user input (for example, by deflecting a toggle, such as, toggle 211 shown in FIG. 10). In one aspect, displays 214 and 216 may include graphical images or "icons" that may depict an orientation of a slide holding the specimen and/or the relative direction of movement of the slide. For example, in one aspect, when the toggle switch 211 (see FIG. 10) is toggled or "flipped" left, display 214 or 216 may be adapted to display a symbol (such as, a "plus" [+] sign), an image, or a picture of a slide oriented to the left, for example, where the orientation of the slide is such that the label on the slide is positioned on the left-hand side of the slide as viewed from above. Conversely, when the switch 211 is flipped right, display 214 or 216 may display a symbol (such as, a "minus" [−] sign), an image, or a picture of a slide oriented to the right, for example, where the orientation of the slide is such that the label on the slide is positioned on the right-hand side of the slide as viewed from above. In another aspect, next to displays 214 and 216 arrows may be used to indicate relative slide movement and/or orientation, for example, "up and down" arrows, "left and right" arrows, and/or "side to side" arrows. Other suitable labels and/or prefixes indicating slide movement or orientation is also envisioned, as appropriate.

In another aspect, differentiation of the detected locations displayed on displays 214 and 216 may be indicated numerically, or alphanumerically, for example, by introducing a predetermined increase or decrease in the detected location or an amended display. For example, in one aspect, a predetermined arbitrary increase or decrease of N units may be introduced to create an amended or modified value, where one display may display the detected location and the other display displays the modified value comprising the detected dimension plus N, where N may typically be an integer, for example, ranging from −9 to 9 or from −9000 to +9000. For example, in one aspect, potentiometer 72 may be powered by a voltage of 4999 mV, and the location of pointer 51 or 53 on potentiometer 72 may be determined as a function the 4999 mV and N=5000. Accordingly, when the detected locations are an "X" location of 3500 mV and a "Y" location of 3800 mV, display 214 may display an X location of "3500" and display 216 may display a Y location of "8800" (that is, Y+N=3800+5000). Accordingly, a user or investigator will more readily associate the amended, or modified value, "8800" displayed on display 216 with a location "3800 in the Y direction" and more readily associate the unamended, or unmodified value, "3500" displayed on display 214 with a location "3500 in the X direction." The use of other predetermined increases or decreases N will be apparent to those of skill in the art. This manipulation of the signals output by the potentiometers 72 may be performed by appropriate software, for example, software loaded and executed by processor 228 in receiver 210 and/or software loaded and executed in displays 214 and/or 216.

FIG. 12 is a top plan view of a stage 252 having a slide positioning or orientation detecting system 250 according to another aspect of the invention. FIG. 13 is a detailed view of the slide positioning system 250 shown in FIG. 12 as identified by Detail 13 in FIG. 12. In a further aspect of the invention, a slide positioning, and/or orientation detecting system 250 is provided which may be used alone or with other aspects of the invention disclosed herein. Slide positioning system 250 may be used to ensure that a slide 256 having a target or specimen is properly or repeatably positioned and/or oriented on stage 252, for example, to reacquire a previously located target. In another aspect, slide-positioning system 250 may be used to amend the X/Y coordinates displayed by aspects of the invention (for example, with a "minus" [−] sign), as disclosed herein, for example, by changing the polarity of the electrical signals received by receiver 210. In one aspect, this aspect of the invention may be used to ensure that once a target or specimen on slide 256 is located according to aspects of the invention, the target can be re-located or re-acquired at a later time, for example, by the same or a different microscope user or investigator.

As shown in FIGS. 12 and 13, in one aspect, system 250 includes a microscope stage 252 having a slide holder 254. Stage 252 and/or slide holder 254 may be coupled to one or more potentiometer assemblies 50 or 52 as disclosed herein. In one aspect, slide holder 254 may have arms 253 and/or 255, for example, flexibly biased arms, for instance, spring-biased arms, adapted to engage slide 256.

As shown in FIG. 13, according to aspects of the invention, slide holder 254 includes two electrical contacts, 258 and 260 which are each electrically coupled to electrical conductors 259 and 261, respectively. At least one of conductors 259 and 261 may typically have a voltage operatively applied thereto. As shown in FIGS. 12 and 13, contacts 258 and 260 may be positioned on the edge of an arm 253 or 255 of the slide holder 254, though contacts 258 and 260 may be located anywhere on stage 252 and/or slide holder 254. As also shown in FIG. 13, system 250 also includes a microscope slide 256 typically having a label or frosted area 251 and an electrically conductive strip or contact 257, for example, an aluminum or copper strip, positioned along at least one side or edge of slide 256.

According to aspects of the invention, when slide 256 is positioned in slide holder 254 where conductive strip 257 contacts each of the contacts 258 and 260, an electric current (for example, ranging from 1 to 300 milliamps [mA] and a voltage ranging from 1.5 to 12 volts) can pass from one contact to the other contact through conductive strip 257. According to aspects of the invention, the current passed between contacts 258 and 260 and/or the voltage (for example, 1 to 6 volts DC [VDC]) present on one of the contacts 258 and/or 260 may be detected to indicate the presence of slide 256 on slide holder 254. In one aspect, when a predetermined current and/or a predetermined voltage is detected, aspects of the invention may advise a user that slide 256 is properly or improperly positioned, for example, positioned as preferred by the investigator or positioned in the orientation specified when the target was previously located, for instance, with the label 251 on the left. Conversely, in one aspect, the absence of the predetermined current and/or predetermined voltage may result in the user being advised that slide 256 is properly or improperly positioned, for example, not positioned in the orientation specified when the target was previously located. In one aspect, the advising of the user may be practiced by means of an audible or visual signal, for example, emitted by a transmitter located in or on receiver 210.

In another aspect, a location or a set of coordinates associated with a target on a slide may also include an orientation of the slide when the target was initially located, for example, with the label 251 of the slide on the left or the right of the slide as the slide 256 is viewed from above. (Typically, a slide is viewed from the top or working surface of the slide as defined by the presence of the specimen on the working surface.) For example, in one aspect, when a location or set of coordinates of a target are initially identified, an orientation of the slide at the time the target is located may also be identified, stored, and/or recorded, for example, whether conductive strip 257 contacts the contacts 258 and 260 or not. This aspect of the invention may be implemented with the system 250 shown in FIGS. 12 and 13 or with any other aspect disclosed herein.

In one aspect, the orientation of the slide when a target is located, for example, initially located, may be indicated by associating at least one of the displayed coordinates, but typically both of the coordinates, with a character (for example, a minus sign, "−"), an icon, or other image, for example, in front of the numerals of the displayed coordinates, for example, by changing the polarity of one or more of the electrical signals received by receiver 210. For example, should a target be located when the slide 256 is orientated with label 251 on the left (opposite from what shown in FIG. 12), the coordinates of the target displayed on displays 214 and 216 of receiver 210 may be amended with a character, an icon, or an image, for example, where the display on display 214 may appear as "−3500" and the display on display 216 may appear as "−9445," and saved, stored, or recorded as such. In another aspect, the amending of the display that appears on displays 214 and/or 216 to indicate slide orientation may be practiced by changing the polarity of one or more of the electrical signals received by receiver 210, for example, received via electrical connection 202 and/or 204. This change in polarity may be effected automatically, for example, by software in receiver 220, or manually be means of, for example, switch 211 on receiver 210.

Conversely, in one aspect, when a target is located when the slide 256 is orientated with label 251 on the right (as shown in FIG. 12), the character, icon, or image may be changed (for example, from a "−" to a "+") or omitted. In one aspect, the introduction of the character, icon, or image to displays 214 and 215 may be manually introduced by the operator by activating a switch on receiver 210, for example, "flipping" switch 211 "to the right" to indicate that label 251 is positioned on the right of slide 256 when the coordinates of the target on the slide were determined. In another aspect, the introduction of the character, icon, or image to displays 214 and 216 may be automatedly introduced, for example, when the orientation of slide 256 is detected by orientation detection system 250 shown in FIGS. 12 and 13. When detected by system 250, software, for instance, software in receiver 210, may introduce or omit the character, icon, or image to displays 214 and 216 accordingly, or change the polarity of the one or more electrical signals received by receiver 210. Similarly, when slide 256 is subsequently examined by the same or a different investigator, the presence of the character, icon, or image with the recorded coordinates of the target, for example, with an icon of an arrow directed to the right (for instance, "→3500" and "→9445"), the investigator will understand that the label 251 must be "on the right" of slide 256 in order to reacquire the desired target. Again, the appearance of the character, icon, or image, such as, the arrow directed to the right ("→") may be introduced to displays 214 and 216 by flipping switch 211 in the appropriate direction. Also, this orientation of slide 256 may be associated with an audible or visual signal.

In another aspect, when the orientation of the slide is omitted, or inadvertently lost, when an attempt is made to re-acquire the target with the recorded location or set of coordinates, the presence or absence of the target in the field of view of the microscope when the slide is positioned to reacquire the target can be interpreted by the operator to mean that the orientation of the slide is not the same as the orientation of the side at the time of the initial location of the target, and thus the slide may need to be re-oriented to locate the target. In one aspect, when a target fails to appear, the polarity of one or more the electrical signals may be varied accordingly, with a corresponding re-orientation (that is, a change in orientation) of the slide, for example, to where the target does appear in the field of view of the microscope.

In another aspect, when an attempt to reacquire the target using the initial target location or set of coordinates, and the slide orientation does not conform to the slide orientation when the position or set of coordinates were identified (for example, due to contact or lack of contact of strip 257 with contacts 258 and 260 or due to inconsistencies with the direction of switch 211), receiver 210 may advise the operator of the difference in orientation by means of an audible or visual signal, for example, by illuminating beacon 213.

In another aspect, when a predetermined current and/or a predetermined voltage is detected or absent from system 250, aspects of the invention may advise a user or advise receiver 210 concerning the orientation of slide 256, for example, oriented to the "left" or to the "right." For example, system 250 may advise the user whether slide 256 is positioned in an orientation different from the orientation of the slide when the target on the slide was previously located, for instance, in the orientation preferred by the prior investigator.

As shown in FIG. 13, in one aspect, the conductive strip 257 may be located on slide 256 and contacts 258 and 259 may be located on stage 252 and/or slide holder 254. However, in another aspect, the conductive strip 257 may be located on stage 252 and/or slide holder 254 and contacts 258 and 259 may be located on slide 256.

According to aspects of the invention, the methods, systems, apparatus, and devices disclosed in FIGS. 3-13 enable an operator to document the location of a target on a slide so that the operator can reacquire the target at a later date with ease. The location or coordinates of the target can include the orientation of the slide holding the target, for example, label 251 to the left or right. In one aspect, the operator can use a specially designed slide 256 that can facilitate reacquiring a target. Other aspects of the invention can be used with conventional microscope slides, for example, by inputting the relative orientation of the slide to the system, for example, by simply flipping a toggle switch 211 to indicate the orientation of the slide. In one aspect, the orientation of the slide, for example, either left or right, can be a further specification of the location or coordinates of the target of interest. For example, aspects o the invention may be used as follows. First, after mounting a specimen, for example, a blood sample, onto a slide 43 (see FIG. 3) or a slide 256 (see FIGS. 12 and 13), where slide 256 includes a conductive strip 257, the slide 256 may be inserted into slide holder 254 having contacts 258 and 260, where at least one of which has a voltage (for example, 6 VDC) provided by conductors 259 or 261. When slide 256 is inserted into slide holder 254 where conductive strip 257 contacts (or fails to contact due to slide orientation) both contacts 258 and 260, the voltage or current (for example, a 300 milliamp [mA] current from conductor 259 to conductor 261, or lack of current or voltage) can be detected with electronics operatively connected to conductors 259 and 261 (for example, electronics located within receiver 210, see FIGS. 10 and 11). When the voltage or current is detected, or not, the investigator is advised by the electronics, for example, via an illuminated display or audible signal how slide 256 is positioned and/or an appropriate indicator (for example, a minus sign ("−"), when no contact is detected) on display 214 and/or 216, and observation with a microscope (such as, microscope 10 in FIG. 1) may proceed.

With the positioning of slide 43 or 256 on stage 42 (see FIG. 3), the investigator may then visually examine slide 43 or 256 with microscope 10 using the control knobs 28 (see FIG. 2) and microscope optics 18 (see FIG. 1). According to aspects of the invention, while the investigator operates control knobs 28 and translates stage 42 (see FIG. 3) and/or slide holder 46 (see FIG. 3), linkages associated with potentiometer assemblies 50 and 52 (for example, rods 56 and 58, respectively) also translate potentiometer pointers 51 and 53, respectively, along respective linear potentiometers 72 (see FIGS. 5 through 8). According to aspects of the invention, potentiometer pointers 51 and 53 may contact their respective linear potentiometers 72 during their translation; however, in another aspect, pointers 51 and 53 may not be in contact with their respective linear potentiometers 72 until the operator makes the desired contact by engaging pointers 51 and 53 with potentiometer 72, for example, by rotating pointers 51 and 53 in their threaded mounting holes or by compressing a quick-engagement/disengagement button, or the like, mounted in pointers 51 and 53.

According to an aspect of the invention, when the investigator locates a target on slide 43 or 256, for example, when the investigator identifies a specimen that captures the investigator's interest, such as, a cell or a fiber, the investigator can record or otherwise document the location of the target using aspects of the invention. For example, when the desired target is in the field of view of the microscope, the investigator can observe the location of pointers 51 and 53 on potentiometers 72 displayed on displays 214 and 216. The investigator can then record the locations, for example, manually record the displayed locations by writing them down, printing, or electronically store the locations, for example, in storage device 230 in receiver 210. As noted above, the investigator may also document the orientation of the slide, for example, by introducing a minus sign [−] to one or more of the recorded locations, for example, by changing a polarity of one or more of the signals received by receiver 210, and displayed on displays 214 and/or 215.

In one aspect, the electric signals transmitted by potentiometers 72 may correspond substantially exactly with the location of contact of pointers 51 and 53 upon potentiometers 72. For example, in one aspect, potentiometers 72 may output a voltage numerically equivalent to the location of the point of contact. In another aspect, potentiometers 72 may output a voltage proportional to the distance of the location of the point of contact to the length of potentiometers 72, for example, the "active" length of potentiometers 72. For instance, when the potentiometers 72 have an active length L (in mm) and full length voltage V (in mV), the voltage output by potentiometers 72 at contacts 75, 76, or 77, that is, $V_P$, may correspond to the location of contact X (in mm), according to Equation 1:

$$V_P = (X/L) \times V \qquad \text{Equation 1}$$

Equation 1 may be transposed to yield an X location of the point of contact of pointer 51, when the target is in the field of view of the microscope, according to Equation 2, for example, as evaluated by the processor in receiver 210.

$$X = (V_P/V) \times L \qquad \text{Equation 2}$$

Upon receipt of, for example, voltage $V_P$ by receiver 210, Equation 2 may be evaluated by the processor in receiver 2, to yield the location X, which can then recorded or output as desired, for example, displayed on display 214.

A similar calculation can be evaluated by the processor of receiver 210 for the Y location (and/or Z location) of pointer 53. The resulting X and Y values can then be displayed on displays 214 and 216, saved on storage device 230 (see FIG. 11), manually written down, or otherwise recorded for future use.

At that subsequent time, when the target on slide 43 or on slide 256 is to be re-examined, slide 43 may be mounted on stage 42 (FIG. 3) or on stage 252 (see FIGS. 12 and 13) for re-examination with microscope 10. When slide 256 is mounted on stage 252, the desired positioning of slide 256 may be repeated as discussed above, that is, with or without contact between conductive strip 257 with contacts 258 and 260.

Contrary to the practices and teachings of the prior art, aspects of the invention, may be used to more readily re-acquire the desired target on slide 43 or 256. Specifically, according to aspects of the invention, by retrieving the X and Y locations recorded earlier (as discussed above) and, using the control knobs 28, and the locations output by potentiometers 72 due to contact with points 51 and 53, and, for example, the displays 214 and 216, the position of slide 43 or 256 can be re-established in substantially the same position on stage 42 or 252 where the desired target, for example, a blood cell or a polyester fiber of interest, can be re-acquired and viewed in the field of view of microscope 10 and further investigated as needed.

According to aspects of the invention, methods, systems and devices are provided that facilitate and enhance the practice of locating targets or specimens on microscope slides, especially, for re-acquiring previously located targets or specimens. Though disclosed herein with respect to the application of aspects of the invention to optical microscopes, it is envisioned that aspects of the invention may be applied to any viewing or detecting device, for example, digital, electron, and atomic-force microscopes.

The terminology used herein is provided for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The invention claimed is:

1. An apparatus for locating a target on a slide in a field of view of a microscope, the apparatus comprising:
   a housing;
   a linear potentiometer positioned in the housing, the linear potentiometer adapted to output a signal;

a contact slidably mounted in the housing and adapted to selectively contact the linear potentiometer, wherein a position of the contact on the linear potentiometer determines the signal output by the linear potentiometer;

a linkage having a first end operatively connected to the contact and a second end operatively connected to the slide having the target, wherein the slide is translatable in a first direction; and a receiver adapted to receive the signal output by the linear potentiometer and, using the signal, determine a position of the translatable slide.

2. The apparatus as recited in claim 1, wherein the linear potentiometer comprises a membrane-type linear potentiometer.

3. The apparatus as recited in claim 1, wherein the apparatus further comprises a slider block adapted to translate within the housing and to retain the contact, and wherein the first end of the linkage is connected to the slider block.

4. The apparatus as recited in claim 3, wherein the housing comprises a channel adapted to receive the slider block.

5. The apparatus as recited in claim 1, wherein the linkage comprises at least one rod.

6. The apparatus as recited in claim 1, wherein the housing comprises a first housing, wherein the linear potentiometer comprises a first linear potentiometer, wherein the signal comprises a first signal, wherein the contact comprises a first contact, and wherein the linkage comprises a first linkage, and wherein the apparatus further comprises:
a second housing;
a second linear potentiometer positioned in the second housing, the second linear potentiometer adapted to output a second signal;
a second contact slidably mounted in the second housing and adapted to selectively contact the second linear potentiometer, wherein a position of the second contact on the second linear potentiometer determines the second signal output by the second linear potentiometer; and
a second linkage having a first end operatively connected to the second contact and a second end operatively connected to the slide, the slide translatable in a second direction, different from the first direction.

7. The apparatus as recited in claim 6, wherein the receiver is further adapted to receive the first signal and the second signal and display a first output for the first signal and a second output for the second signal.

8. The apparatus as recited in claim 7, wherein the receiver is further adapted to increase a numeric display corresponding to the second signal by 5000 to differentiate the second output from the first output.

9. The apparatus as recited in claim 7, wherein the receiver is further adapted to change a polarity of at least the second output in response to a detected orientation of the slide.

10. The apparatus as recited in claim 1, wherein the apparatus further comprises a slide positioning system.

11. A method for locating a target on a slide in a field of view of a microscope, the method comprising:
operatively connecting a contact to the slide on a stage of the microscope;
translating the slide, and thereby translating the contact, wherein the target on the slide appears in the field of view of the microscope;
visually locating the target in the field of view of the microscope;
contacting the contact with a linear potentiometer wherein the linear potentiometer generates an electrical signal corresponding to a position of the contact on the linear potentiometer; and
relating the detected position of the contact to a position of the slide for the target.

12. The method of claim 11, wherein the method further comprises recording the position of the specimen holder.

13. The method of claim 12, wherein the method further comprises varying the position of the slide, translating the slide and thereby translating the contact to the recorded position of the target, and viewing the target in the field of view of the microscope.

14. The method as recited in claim 11, wherein
operatively connecting the contact to the slide on the stage of the microscope comprises operatively connecting a first contact to the slide on the stage and operatively connecting a second contact to the slide on the stage;
wherein translating the slide comprises translating the first contact and the second contact;
wherein contacting the contact with the linear potentiometer comprises contacting the first contact with a first linear potentiometer and generating a first electrical signal corresponding to a position of the first contact and contacting the second contact with a second linear potentiometer and generating a second electrical signal corresponding to a position of the second contact; and
wherein relating the detected position of the contact to a position of the slide comprises displaying a first display corresponding to the first electric signal and displaying a second display corresponding to the second electrical signal.

15. The method as recited in claim 14, wherein the method further comprises differentiating the position of the first contact from the position of the second contacting by increasing a numerical display corresponding to the second signal by 5000.

16. The method as recited in claim 14, wherein the method further comprises changing a polarity of at least the second output in response to a detected orientation of the slide.

17. The method of claim 11, wherein relating the detected position of the contact to the position of the specimen holder for the target comprises modifying a display corresponding to the electrical signal generated by the linear potentiometer to create a modified display and recording the modified display.

18. The method of claim 11, wherein the method further comprises detecting an orientation of the slide.

19. The method of claim 18, wherein detecting the orientation of the slide comprises contacting electrical contacts with a conductive strip.

20. The method of claim 19, wherein contacting electrical contacts comprises one of contacting electrical contacts on a microscope stage with a conductive strip on the slide and contacting electrical contacts on the slide to a conductive strip on the microscope stage.

21. The apparatus as recited in claim 1, wherein the housing comprises a housing mountable to at least one of a stage of the microscope and a slide holder of the microscope.

22. The apparatus as recited in claim 1, wherein the second end of the linkage operatively connected to the slide comprises one of operatively connected to a microscope stage holding the slide and a microscope slide holder holding the slide.

23. The apparatus as recited in claim 10, wherein the slide positioning system comprises electrical contacts adapted to engage a conductive strip.

24. The method of claim 11, wherein operatively connecting the slideable contact to the slide comprises operatively connecting the slideable contact to one of a translatable specimen holder and a translatable microscope stage.

25. The method of claim 24, wherein operatively connecting the slideable contact to one of the translatable specimen holder and the translatable microscope stage comprises operatively connecting the slideable contact to one of the translatable specimen holder and the translatable microscope stage with one or more rods.

26. The method of claim 11, wherein contacting the contact with the linear potentiometer comprises one of rotating the contact through a threaded hole until the contact contacts the linear potentiometer and deflecting the contact until the contact contacts the linear potentiometer.

\* \* \* \* \*

UNITED STATES PATENT AND TRADEMARK OFFICE
CERTIFICATE OF CORRECTION

| | | |
|---|---|---|
| PATENT NO. | : 9,739,994 B1 | Page 1 of 1 |
| APPLICATION NO. | : 15/373636 | |
| DATED | : August 22, 2017 | |
| INVENTOR(S) | : William A. Loeb | |

It is certified that error appears in the above-identified patent and that said Letters Patent is hereby corrected as shown below:

In the Specification

Column 7, Line 54: Replace "58" with "59"

Column 9, Line 37: Replace "00" with "100"

Column 9, Line 41: Replace "00" with "100"

Column 13, Line 63: Replace "target or" with "target, or"

Column 13, Line 64: Replace "are" with "is"

Column 14, Line 1: Replace "specimen holder 74" with "slide holder 46"

Column 17, Line 22: Replace "220" with "210"

In the Claims

Claim 12, Line 8: Replace "the specimen holder" with "the slide"

Claim 15, Line 37: Replace "second contacting" with "second contact"

Claim 17, Line 45: Replace "the specimen holder" with "the slide"

Signed and Sealed this
Tenth Day of April, 2018

Andrei Iancu
*Director of the United States Patent and Trademark Office*